United States Patent
Bitra et al.

(10) Patent No.: US 9,797,983 B1
(45) Date of Patent: Oct. 24, 2017

(54) MEASURING POSITIONING SIGNALS BASED ON ASSISTANCE DATA

(71) Applicant: QUALCOMM Incorporated, San Diego, CA (US)

(72) Inventors: Suresh Kumar Bitra, Mangalagiri (IN); Ashwin Kumar Donthula, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/479,394

(22) Filed: Apr. 5, 2017

(51) Int. Cl.
   *H04W 24/00* (2009.01)
   *G01S 5/02* (2010.01)
   *H04W 4/02* (2009.01)

(52) U.S. Cl.
   CPC ............ *G01S 5/0252* (2013.01); *G01S 5/021* (2013.01); *G01S 5/0236* (2013.01); *H04W 4/023* (2013.01)

(58) Field of Classification Search
   CPC ...... G01S 5/0252; G01S 5/021; G01S 5/0236; H04W 4/023
   See application file for complete search history.

(56) References Cited

U.S. PATENT DOCUMENTS

| 2010/0331009 | A1  | 12/2010 | Krishnamurthy et al. |
| 2011/0170524 | A1* | 7/2011  | Arslan ............... G01S 5/0252 370/338 |
| 2012/0021769 | A1* | 1/2012  | Lindoff ............... G01S 5/0063 455/456.1 |
| 2013/0336224 | A1  | 12/2013 | Davydov et al. |
| 2014/0128087 | A1  | 5/2014  | Zhang et al. |
| 2015/0296359 | A1  | 10/2015 | Edge et al. |
| 2017/0238298 | A1* | 8/2017  | Wang ............... H04W 72/048 |

FOREIGN PATENT DOCUMENTS

WO    2016122812 A1    8/2016

* cited by examiner

*Primary Examiner* — Chuong A Ngo
(74) *Attorney, Agent, or Firm* — Hunter Clark PLLC

(57) ABSTRACT

A method of operating a user equipment includes receiving, from a location server, first information about a first plurality of positioning signals expected to be transmitted by a first set of base stations; receiving, from a tile information server, second information about a second plurality of positioning signals expected to be transmitted by a second set of base stations, the second set of base stations including at least one additional base station not included in the first set of base stations; measuring a third plurality of positioning signals received from a combination of a first subset of the first set of base stations and a second subset of the second set of base stations, the third plurality of positioning signals including an additional positioning signal transmitted by the at least one additional base station; and sending measurement results for the third plurality of positioning signals to the location server.

30 Claims, 7 Drawing Sheets

US 9,797,983 B1

MEASURING POSITIONING SIGNALS BASED ON ASSISTANCE DATA

BACKGROUND

A User Equipment (UE)—such as a cellular phone, smart phone, tablet computer, laptop computer, smart watch, and other mobile device—is often configured to perform positioning techniques to determine the location of the UE. For example, multilateration techniques may be used to determine the location of the UE based on positioning signals received from multiple base stations of a wireless network. One example of a positioning technique that uses multilateration is Observed Time Difference Of Arrival (OTDOA), which is a long term evolution (LTE) positioning procedure defined by the 3rd Generation Partnership Project (3GPP). In OTDOA, the UE receives positioning reference signals (PRS) or cell-specific reference signals (CRS) from nearby base stations. The UE makes Reference Signal Time Difference (RSTD) measurements using time of arrival estimates of the received PRS from multiple base stations.

To perform positioning techniques, such as OTDOA, the UE relies on assistance data that include information about the positioning signals and/or the base stations. The location of the UE may be determined by the UE itself, or the measurements made by the UE may be transmitted to a location server of the wireless network, which then determines the location of the UE.

SUMMARY

An example of a method of operating a UE includes receiving, from a location server via a transceiver, first information about a first plurality of positioning signals expected to be transmitted by a first set of base stations; receiving, from a tile information server via the transceiver, second information about a second plurality of positioning signals expected to be transmitted by a second set of base stations, the second set of base stations including at least one additional base station not included in the first set of base stations; measuring a third plurality of positioning signals received via the transceiver from a combination of a first subset of the first set of base stations and a second subset of the second set of base stations, the third plurality of positioning signals including an additional positioning signal transmitted by the at least one additional base station; and sending, via the transceiver, measurement results for the third plurality of positioning signals to the location server.

Implementations of such a method may include one or more of the following features. The method may include determining, using a processor of the UE, that a location-error estimate based on the first set of base stations is greater than a threshold error value. The measuring the additional positioning signal may occur in response to the determining that the location-measurement precision estimate based on the first set of base stations is greater than the threshold error value. The method may include obtaining a respective location of each base station of the first set of base stations; and determining the location-error estimate based on the respective location of each base station of the first set of base stations. The method may include obtaining a respective location of each base station of the second set of base stations; determining a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and selecting the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

Implementations of such a method may also include one or more of the following features. The method may include determining, using a processor of the UE, that the first set of base stations includes less than a threshold number of base stations. The measuring the additional positioning signal may occur in response to the determining that the first set of base stations includes less than the threshold number of base stations. The method may include determining the threshold number of base stations based on a measurement capacity of the UE. The method may include determining, using a processor of the UE and the first information, that a first-channel number of base stations, of the first set of base stations, that are expected to transmit respective positioning signals of the first plurality of positioning signals using a first frequency channel is greater than a single-channel threshold, wherein the measuring the additional positioning signal occurs in response to the determining that the first-channel number is greater than the single-channel threshold. The method may include determining, using the processor of the UE and the second information, that the at least one additional base station is expected to transmit the additional positioning signal using a second frequency channel that is different from the first frequency channel; and selecting the at least one additional base station based on the determining that the additional base station is expected to transmit the additional positioning signal using the second frequency channel.

An example of a UE includes a transceiver configured to receive first signals from a first set of base stations and a second set of base stations, and send second signals to the first set of base stations and the second set of base stations. The UE also includes a processor, communicatively coupled to the transceiver, configured to receive, from a location server via the transceiver, first information about a first plurality of positioning signals expected to be transmitted by the first set of base stations; receive, from a tile information server via the transceiver, second information about a second plurality of positioning signals expected to be transmitted by the second set of base stations, wherein the second set of base stations includes at least one additional base station not included in the first set of base stations; measure a third plurality of positioning signals received via the transceiver from a combination of a first subset of the first set of base stations and a second subset of the second set of base stations, wherein the third plurality of positioning signals includes an additional positioning signal transmitted by the at least one additional base station; and send, via the transceiver, measurement results for the third plurality of positioning signals to the location server.

Implementations of such a UE may include one or more of the following features. The processor may be configured to determine that a location-error estimate based on the first set of base stations is greater than a threshold error value; and measure the additional positioning signal in response to a determination that the location-measurement precision estimate based on the first set of base stations is greater than the threshold error value. The processor may be configured to obtain a respective location of each base station of the first set of base stations; and determine the location-error estimate based on the respective location of each base station of the first set of base stations. The processor may be configured to obtain a respective location of each base station of the second set of base stations; determine a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and select the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

Implementations of such a UE may also include one or more of the following features. The processor may be configured to determine that the first set of base stations includes less than a threshold number of base stations; and measure the additional positioning signal in response to a determination that the first set of base stations includes less than the threshold number of base stations. The processor may be configured to determine the threshold number of base stations based on a measurement capacity of the UE. The processor may be configured to determine, using the first information, that a first-channel number of base stations, of the first set of base stations, that are expected to transmit respective positioning signals of the first plurality of positioning signals using a first frequency channel is greater than a single-channel threshold; and measure the additional positioning signal in response to a determination that the first-channel number is greater than the single-channel threshold. The processor may be configured to determine, using the second information, that the at least one additional base station is expected to transmit the additional positioning signal using a second frequency channel that is different from the first frequency channel; and select the at least one additional base station based on a determination that the at least one additional base station is expected to transmit the additional positioning signal using the second frequency channel.

An example of a UE includes means for receiving, from a location server, first information about a first plurality of positioning signals expected to be transmitted by a first set of base stations; means for receiving, from a tile information server, second information about a second plurality of positioning signals expected to be transmitted by a second set of base stations, wherein the second set of base stations includes at least one additional base station not included in the first set of base stations; means for measuring a third plurality of positioning signals received from a combination of a first subset of the first set of base stations and a second subset of the second set of base stations, wherein the third plurality of positioning signals includes an additional positioning signal transmitted by the at least one additional base station; and means for sending measurement results for the third plurality of positioning signals to the location server.

Implementations of such a UE may include one or more of the following features. The UE may include means for determining that a location-error estimate based on the first set of base stations is greater than a threshold error value; and means for measuring the additional positioning signal in response to a determination that the location-measurement precision estimate based on the first set of base stations is greater than the threshold error value. The UE may include means for obtaining a respective location of each base station of the first set of base stations; and means for determining the location-error estimate based on the respective location of each base station of the first set of base stations. The UE may include means for obtaining a respective location of each base station of the second set of base stations; means for determining a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and means for selecting the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

Implementations of such a UE may also include one or more of the following features. The UE may include means for determining that the first set of base stations includes less than a threshold number of base stations; and means for measuring the additional positioning signal in response to a determination that the first set of base stations includes less than the threshold number of base stations. The UE may include means for determining the threshold number of base stations based on a measurement capacity of the UE. The UE may include means for determining, using the first information, that a first-channel number of base stations, of the first set of base stations, that are expected to transmit respective positioning signals of the first plurality of positioning signals using a first frequency channel is greater than a single-channel threshold; and means for measuring the additional positioning signal in response to a determination that the first-channel number is greater than the single-channel threshold. The UE may include means for determining, using the second information, that the at least one additional base station is expected to transmit the additional positioning signal using a second frequency channel that is different from the first frequency channel; and means for selecting the at least one additional base station based on a determination that the at least one additional base station is expected to transmit the additional positioning signal using the second frequency channel.

An example of a non-transitory, processor-readable storage medium includes processor-readable instructions configured to cause a processor of a UE to receive, from a location server via a transceiver of the UE, first information about a first plurality of positioning signals expected to be transmitted by a first set of base stations; receive, from a tile information server via the transceiver, second information about a second plurality of positioning signals expected to be transmitted by a second set of base stations, wherein the second set of base stations includes at least one additional base station not included in the first set of base stations; measure a third plurality of positioning signals received via the transceiver from a combination of a first subset of the first set of base stations and a second subset of the second set of base stations, wherein the third plurality of positioning signals includes an additional positioning signal transmitted by the at least one additional base station; and send measurement results for the third plurality of positioning signals to the location server.

Implementations of such a non-transitory, processor-readable storage medium may include one or more of the following features. The non-transitory, processor-readable storage medium may include instructions configured to cause the processor to determine that a location-error estimate based on the first set of base stations is greater than a threshold error value; and measure the additional positioning signal in response to a determination that the location-measurement precision estimate based on the first set of base stations is greater than the threshold error value. The non-transitory, processor-readable storage medium may include instructions configured to cause the processor to obtain a respective location of each base station of the first set of base stations; and determine the location-error estimate based on the respective location of each base station of the first set of base stations. The non-transitory, processor-readable storage medium may include instructions configured to cause the processor to obtain a respective location of each base station of the second set of base stations; determine a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and select the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

Implementations of such a non-transitory, processor-readable storage medium may also include one or more of the following features. The non-transitory, processor-readable storage medium may include instructions configured to cause the processor to determine that the first set of base stations includes less than a threshold number of base stations; and measure the additional positioning signal in response to a determination that the first set of base stations includes less than the threshold number of base stations. The non-transitory, processor-readable storage medium may include instructions configured to cause the processor to determining the threshold number of base stations based on a measurement capacity of the UE.

DETAILED DESCRIPTION

Figure 1:
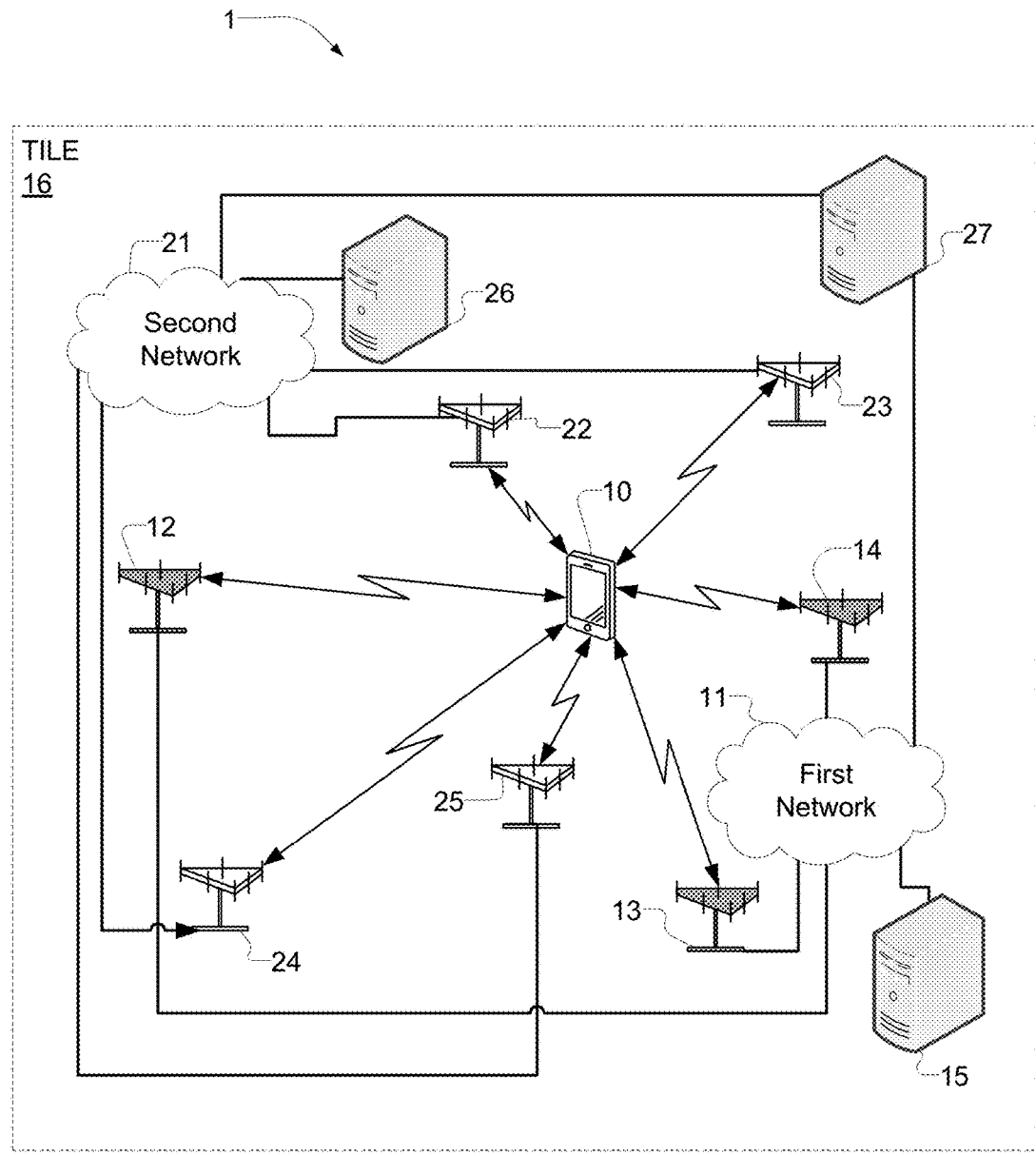
FIG. 1 is a simplified diagram of an example communications environment.

Techniques are discussed herein for improving the performance of positioning techniques by using additional information not provided in assistance data received from a location server of a wireless network to which a UE is connected. The additional information may be tile information received from a tile information server different from the location server of the wireless network. A "tile" refers to an area (for example, a one square kilometer rectangular area) that, together with other tiles, cover a geographic area of an environment in which the UE operates. The tile information may include information about positioning signals and/or base stations of the wireless network to which the UE has a subscription or other wireless networks to which the UE does not have a subscription. The UE may use the tile information to make measurements of positioning signals from base stations that are not included in the assistance data received from the location server. Using the tile information, the UE may select additional base stations from which to measure positioning signals. Measuring positioning signals from the additional base stations may help the accuracy of the positioning technique to be increased and/or the measurement time to be decreased. Thus, the UE may overcome limitations of the assistance data received from the location server by extending the measurement of positioning signals to signals received from base stations not included in the assistance data received from the location server. Other capabilities may be provided and not every implementation according to the disclosure must provide any, let alone all, of the capabilities discussed. Further, it may be possible for an effect noted above to be achieved by means other than that noted, and a noted item/technique may not necessarily yield the noted effect.

Tile information servers may be maintained that are separate and distinct from location servers of a wireless network. The tile information servers store information about base stations of the environment in which the UE operates. This information is referred to as "tile information." The tile information stored on the tile information servers may include information about base stations operated by different carriers (wireless service provider), as opposed to location servers that typically store base station information only for a particular carrier with which the location server is associated. Tile information may be accumulated by the tile information server from crowd-sourced data sent back to the tile information server by UEs. Because not every UE communicates with a single carrier or a single wireless network, the tile information server can accumulate data about base stations from multiple carriers and multiple wireless networks from the different UEs. The tile information may be transmitted to a particular UE for use in performing positioning techniques. The tile information sent to the UE may include more information about the base stations than the information that is included in the assistance data received by the UE from the location server of the wireless network. For example, assistance data used to perform OTDOA does not include information about the location of the base stations, whereas tile information received from the tile information server may include an indication of where each base station included in the tile information is located. A UE may use this additional information to determine the location of the UE without sending measurements back to a server as is done in OTDOA.

The UE may measure positioning signals received from base stations not included in the assistance data received from the location server, e.g., in response to a determination that the assistance data received from the location server is deficient in some way. For example, the number of base stations included in the assistance data may be below a threshold; a geometrical layout of the base stations included in the assistance data may be determined to be insufficient to give sufficiently accurate results; or a frequency channel's use by the base stations included in the assistance data from the location server may result in an undesirably high number of collisions between positioning signals from different base stations.

Referring to FIG. 1, a UE 10 communicates with multiple base stations in a communications environment 1, which includes a first network 11 and a second network 21. The two networks 11, 21 are cellular communications networks that allow the UE 10 to send and receive telephone calls and data. The first network 11 includes base stations 12-14, though, for the sake of clarity, the base stations 12-14 are shown separate from the first network 11 in FIG. 1. The first network 11 uses the base stations 12-14 to wirelessly send information to and receive information from the UE 10 and/or other UEs not shown in FIG. 1. The second network 21 includes base stations 22-25, though for the sake of clarity, the base stations 22-25 are shown separate from the second network 21. The second network 21 uses the base stations 22-25 to wirelessly send information to and receive information from the UE 10 and/or other UEs not shown in FIG. 1. In some examples, the UE 10 may only be able to send and receive telephone calls and data via the first network 11, but not the second network 21. In such a situation, however, the UE 10 may still be configured to receive and measure positioning signals sent by the base stations 22-25 of the second network 21.

Each of the base stations 12-14, 22-25 provides a wireless communications service to UEs within a particular area referred to as a "cell." Each of the base stations 12-14, 22-25 transmits radio frequency (RF) signals to, and receives RF signals from, UEs within a respective cell. Each of the base stations 12-14, 22-25 may be a wireless base transceiver station (BTS), a Node B, an evolved NodeB (eNB), a femtocell, a Home Base Station, a small cell base station, a Home Node B (HNB), a Home eNodeB (HeNB), etc. The first network 11 and the second network 21 may each be a 2G, a 3G, a 4G, or a 5G network, or be a hybrid network (e.g., a 3G/4G network). The first network 11 need not be the same type of network as the second network 21 and may be operated by different carriers or a single carrier. The base stations 12-14, 22-25 of the two networks 11, 21 may wirelessly communicate with the UE 10 using one or more radio access technologies (RATs), such as GSM (Global System for Mobile Communications), code division multiple access (CDMA), wideband CDMA (WCDMA), Time Division CDMA (TD-CDMA), Time Division Synchronous CDMA (TDS-CDMA), CDMA2000, High Rate Packet Data (HRPD), or long term evolution (LTE). These are examples of network technologies that may be used to communicate with the UE 10 over a wireless link, and claimed subject matter is not limited in this respect. GSM, WCDMA and LTE are technologies defined by the 3GPP. CDMA and HRPD are technologies defined by the 3rd Generation Partnership Project 2 (3GPP2). WCDMA is also part of the Universal Mobile Telecommunications System (UMTS) and may be supported by an HNB. Additionally, both the first network 11 and the second network 21 may support more than one RAT. For example, the first network 11 may communicate with the UE 10 using both W-CDMA and LTE. Additionally, the first network 11 and the second network 21 may communicate with the UE 10 using the same RAT. For example, the first network 11 and the second network 21 may both send and receive signals to the UE 10 using LTE. Further, while three base stations are illustrated in FIG. 1 for the first network 11 and four base stations are illustrated for the second network 21, different numbers of base stations may be used.

The base stations 12-14 are communicatively coupled to other portions of the first network 11 using, for example, a physical connection, such as a wired or optical connection. The base stations 22-25 are communicatively coupled to other portions of the second network 21 using, for example, a physical connection, such as a wired or optical connection. For example, in situations where a particular network is an LTE network, the other portions of the particular network may include, but are not limited to, a packet data network gateway, a mobility management entity, a serving gateway, and additional base stations.

The first network 11 further includes a location server 15, and the second network 21 further includes a location server 26, though for the sake of clarity, the location server 15 and the location server 26 are shown separate from the first network 11 and the second network 21, respectively. The location server 15 and the location server 26 may each be one of a variety of server types. For example, each of the location servers 15, 26 may be an Evolved Serving Mobile Location Centre (E-SMLC), a Secure User Plane Location (SUPL) Location Platform (SLP), a SUPL Location Center (SLC), a SUPL Positioning Center (SPC), a Position Determining Entity (PDE) and/or a gateway mobile location center (GMLC), each of which may connect to one or more location retrieval functions (LRFs) and/or mobility management entities (MMEs). The location servers 15, 26 store assistance data for the first network 11 and the second network 21, respectively. The assistance data stored on the location server 15 may include information about the base stations 12-14 of the first network 11, and not the base stations 22-25 of the second network 21, whereas the assistance data stored on the location server 26 may include information about the base stations 22-25 of the second network 21, but not the base stations 12-14 of the first network 11.

The communications environment 1 further includes a tile information server 27, which stores information about base stations located in an area. The stored information is referred to as "tile information." In contrast to the location servers 15, 26, the tile information server 27 is not considered to be part of either the first network 11 or the second network 21. The tile information server 27 may be operated by an entity different from the carrier that operates the first network 11 and different from the carrier that operates the second network 21. By way of example and not limitation, the tile information server 27 may be owned and/or operated by a UE manufacturer, a manufacturer of UE components (e.g., chips), or one or more other third parties (i.e., entities other than the carrier that controls the wireless network). Whereas the assistance data stored on a location server of a particular network is specific to that network, the tile information stored on the tile information server 27 includes information about both the first network 11 and the second network 21. The tile information may be accumulated by the tile information server 27 via crowd-sourced data gathered from multiple UEs. For example, UEs made by a particular manufacturer, or UEs that include chips made by particular manufacturer, may send information related to the positioning signals and/or base stations of a wireless network to the tile information server 27. The UEs used to crowd source the tile information may communicate with different wireless networks. Therefore, the tile information gathered by the tile information server 27 is not limited to one particular network, but may include information about the positioning signals and/or the base stations of multiple wireless networks. For example, the UE 10 of FIG. 1 may only communicate with the location server 15 of the first network 11, but the tile information received from the tile information server 27 may include information about the base stations 12-14 of the first network 11 and the base stations 20-25 of the second wireless network 21.

The communications environment 1 is broken into regions referred to as tiles. FIG. 1 illustrates a single tile 16 that includes the base stations 12-14 of the first network 11 and base stations 22-25 of the second network 21. The tile may be a 1km by 1km square, but other sizes and shapes of tile may be used. While FIG. 1 illustrates the location server 15, the location server 26, the tile information server 27, and the networks 11, 21 within the tile 16, one or more, including possibly all, of the servers 15, 26, 27 and/or the networks 11, 21 may be located at any geographic location including outside of the area of the tile 16. Additionally, some portions of the networks 11, 21 may be within the area of the tile 16 and other portions of the networks 11, 21 may be located outside of the area of the tile 16. The UE 10 receives tile information for the base stations within the tile that the UE 10 occupies, here the tile 16. The UE 10 may also receive assistance data for other tiles near the UE 10, including neighboring tiles.

When in the communications environment 1, the UE 10 receives a variety of wireless signals from the base stations 12-14 and the base stations 22-25. The UE 10 is said to "camp" to a particular base station when the base station is selected by the UE 10 as the primary base station (sometimes referred to as the serving base station or the serving cell) for communications with the respective wireless network. For example, the UE 10 may be camped to the base station 13 of the first network 11, resulting in the UE 10 monitoring paging messages from the base station 13 and sending information to the base station 13 for maintaining and managing the connection to the first network 11. The primary base station may change as the UE 10 moves throughout the communications environment 1. For example, as the UE 10 moves towards the base station 12, the UE 10 may handover the role of primary base station to the base station 12.

The primary base station (e.g., the base station 14 of the first network 11) sends the assistance data to the UE 10 for use in performing one or more positioning techniques. The assistance data originates from a location server 15 of the first network 11. The assistance data include information about the positioning signals that the UE 10 is expected to receive from the primary base station 14 as well as the other base stations 12-13 of the first network 11, but does not include information about positioning signals transmitted by the base stations 22-25 of the second network 21. Additionally, the location server 15 may send assistance data for less than all of the base stations of the first network 11. The location server 15 may select a subset of the base stations of the first network 11 and send assistance data for the subset of base stations only. If the UE 10 is camped to a primary base station (e.g., base station 24) of the second network 21, then a location server 26 of the second network 21 sends assistance data for the second network 21 to the UE 10 via the base station 24.

For each of the base stations whose information is included in communications(s) received by the UE 10 from location server 15, the assistance data includes at least an indication of the identity of each non-serving base station, an indication of the frequency channel (corresponding to an RF band) that each base station will use to send a respective positioning signal, and an indication of the time at which the respective positioning signal is expected to be received by the UE 10. The indication of the time at which the positioning signal is expected to be received may include an indication of the location of the positioning signal within a frame received from a base station. The indication of the location of the positioning signal within a frame may be an indication of a periodicity of the positioning signal (e.g., measured in milliseconds or number of sub-frames), an indication of a sub-frame offset value of the positioning signal, and an indication of the duration of the positioning signal (e.g., measured in milliseconds or number of sub-frames). In the case of OTDOA, the positioning signals are positioning reference signals (PRS), as defined by the LTE standard. Information about the location of the base stations that are expected to send the PRS signals may not be included in the OTDOA assistance data, e.g., because the determination of the location of the UE 10 using OTDOA may occur on the network side (e.g., on the server 15 or the server 26), not on the UE 10 and thus the UE 10 may not need this information. When performing OTDOA, the UE 10 makes time difference measurements that are used by the location server 15 to determine the location of the UE 10.

The UE 10 is configured to perform at least a portion of a positioning technique. For example, the UE 10 may perform time difference measurements, such as RSTD measurements, of the time differences between the arrival times of positioning signals received from multiple base stations. When the location technique being performed by the UE 10 is OTDOA, measurement results from the measurements are sent to the location server 15 to determine the location of the UE 10. The positioning techniques used by the UE 10, however, are not limited to OTDOA. For example, positioning protocols such as the terrestrial downlink positioning (TDP) of Qualcomm® may be performed by the UE 10 to determine the location of the UE 10 based on a time-of-arrival and/or time-difference-of-arrival of positioning signals from multiple nearby base stations. TDP differs from OTDOA in a number of ways. First, in TDP the location determination is performed by the UE 10, not by the location server 15 or some other server, as is the case for OTDOA. By determining the location of the UE 10 locally, the UE 10 may forego sending measurement results to an external server. But to determine the location locally, the UE 10 uses additional information that is not included in the assistance data received from the location server 15. Specifically, the UE 10 uses information about the location of the base stations, which may be included in the tile information received from the tile information server 27. Second, TDP is not limited to using signals from base stations operated by a single carrier. By providing the UE 10 access to the tile information, which includes information about base stations of multiple networks, the number of base stations available for positioning is increased.

The inventors have recognized and appreciated that, in addition to being used to perform TDP, the tile information may also be used to improve the performance of OTDOA. For example, the tile information can be used by the UE 10 to evaluate the assistance data received from the location server 15 and determine whether additional measurements may increase the performance of OTDOA. For example, the UE 10 may use the tile information to determine that there is one or more additional base stations, for which information was not included in the assistance data, that are transmitting positioning signals that, if measured by the UE 10, would increase the accuracy of the position of the UE 10 or decrease a time it takes to make the measurements.

Figure 2:
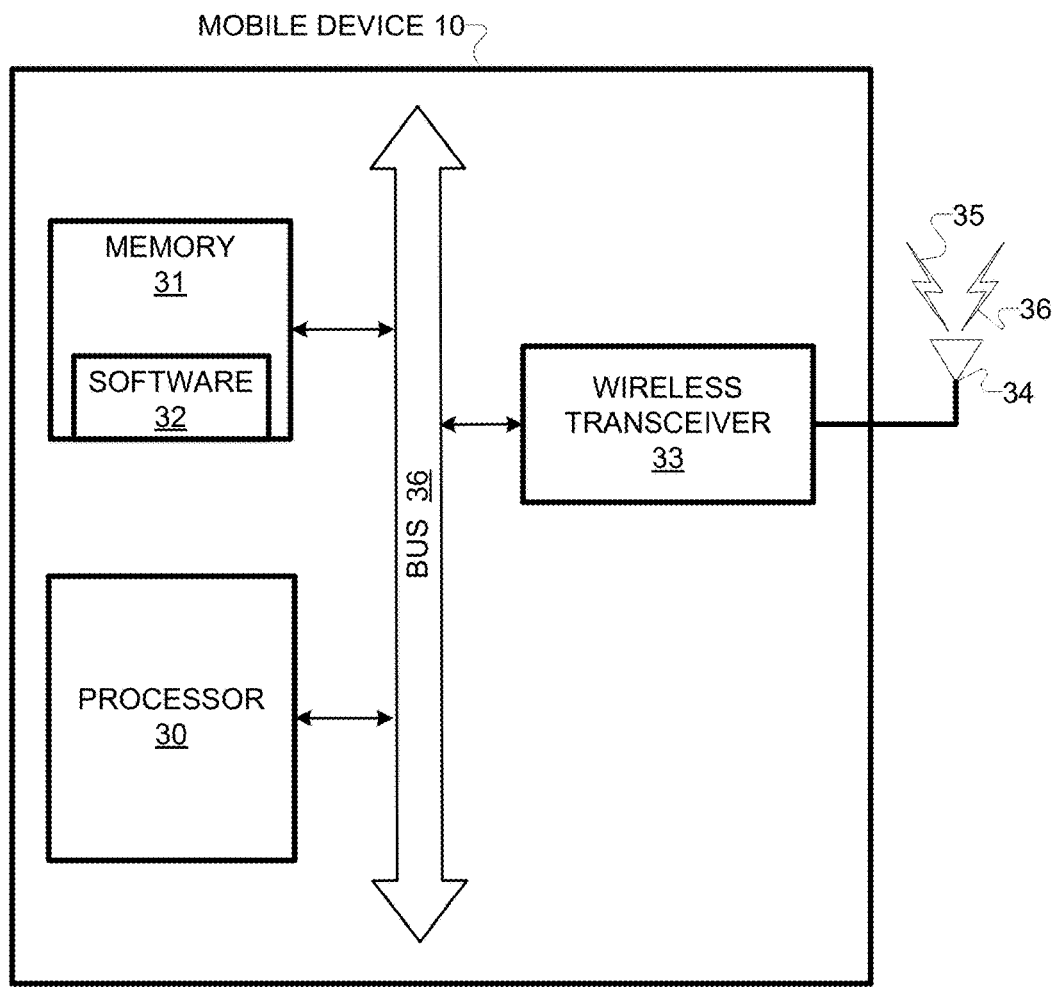
FIG. 2 is a block diagram of an example UE shown in FIG. 1.

Referring to FIG. 2, with further reference to FIG. 1, an example of the UE 10 includes a processor 30, a memory 31 with software 32 stored thereon, and a wireless transceiver 33. The UE 10 is a computer system that may be a handheld mobile device, such as a mobile phone or smart phone. The processor 30 is an intelligent device, e.g., a central processing unit (CPU) such as those made or designed by Qualcomm®, ARM®, Intel® Corporation, or AMD®, a microcontroller, an application specific integrated circuit (ASIC), etc. The memory 31 is a non-transitory, processor-readable memory that stores instructions, such as software 32, that may be executed by processor 30 and includes random access memory (RAM), read-only memory (ROM) and non-volatile memory such as flash memory or solid state storage. The software 32 can be loaded onto the memory 31 by being downloaded via a network connection, uploaded from a disk, etc. Further, the software 32 may not be directly executable, e.g., requiring compiling before execution. The software 32 includes instructions configured to cause the processor 30 to perform functions described herein.

The various components of the UE 10 are communicatively coupled to one another via a bus 36, which is configured to transmit information from one component to another component. For example, the processor 30 is communicatively coupled to the wireless transceiver 33 and the memory 31 via the bus 36. The processor 30 is configured to control the operations of the wireless transceiver 33 by sending commands and information to the wireless transceiver 33 via the bus 36. The wireless transceiver 33 is configured to send information wirelessly received from a base station of a wireless network to the processor 30 via the bus 36.

The wireless transceiver 33 is configured to transmit wireless signals 36 that are intended to be received by one or more base stations of a wireless network. For example, the wireless transceiver 33 may send measurement results, such as RSTD results, intended for the location server 15 to the primary base station 14 of the first network 11. The wireless transceiver 33 is also configured to receive wireless signals 35, sent by one or more base stations, via an antenna 34. For example, the wireless signals 35 may include a positioning signal received from one or more of the base stations 12-14. The wireless transceiver 33 is configured to receive the positioning signal and measure one or more properties of the positioning signal. For example, the wireless transceiver 33 may determine the time of arrival of the positioning signal relative to a clock of the wireless transceiver 33. Alternatively, or additionally, the wireless transceiver 33 may determine the time difference of arrival of two different positioning signals from two different base stations. Furthermore, the wireless transceiver 33 may be configured to receive tile information from the tile information server 27 and the assistance data associated with the base stations 12-14 of the first network 11 from the location server 15. While the wireless transceiver 33 is shown separate from the processor 30, the wireless transceiver 33 may include one or more processors for performing the actions described herein as being performed by the processor 30.

Figure 3:
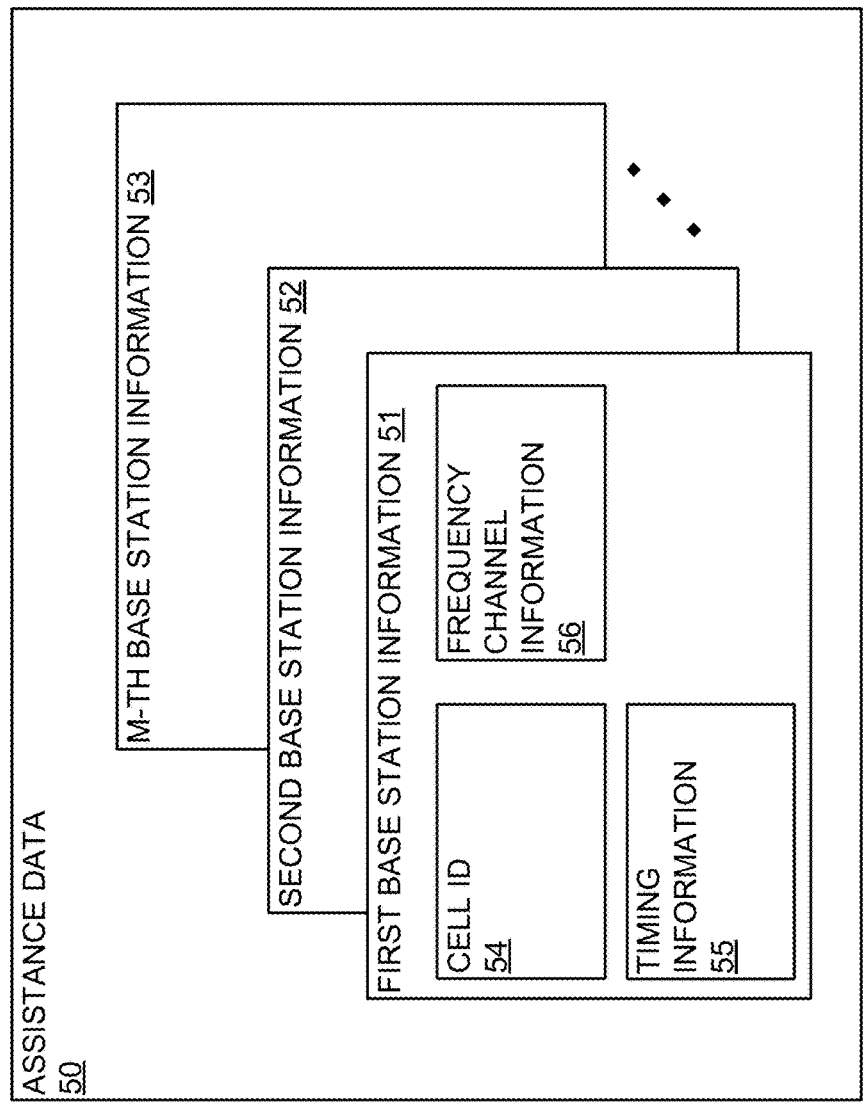
FIG. 3 is an example of assistance data that may be received by the UE of FIG. 2.

Referring to FIG. 3, with further reference to FIGS. 1-2, an example of the assistance data received by the wireless transceiver 22 is the assistance data 50, which includes information for use by the UE 10 for performing one or more positioning techniques. The assistance data 50 is representative of the assistance data sent by the location server 15 of the first network 11 and the assistance data sent by the location server 26 associated with the second network 21. The assistance data 50 includes information about multiple base stations of the associated network. For example, the assistance data 50 includes first base station information 51, second base station information 52, and m-th base station information 53, where m is the total number of base stations for which information is provided by the assistance data 50. Base station information is also provided for any other base station between the second base station and the m-th base station (not shown). For the sake of simplicity and clarity, FIG. 3 only illustrates details for the first base station information 51. The information associated with the other base stations may be the same type of information as the first base station information 51, or it may be different.

The first base station information 51 includes a cell identification (ID) 54, timing information 55 and frequency channel information 56, but additional information may be included. An example of a cell ID 54 is an identifier that the UE 10 and the first network 11 use to identify and/or address a particular base station. The timing information 55 includes an estimate of when the UE 10 is expected to receive a positioning signal. For example, the timing information 55 may include a periodicity, a timing offset and a duration of a positioning signal emitted by the base station. Alternatively or additionally, the timing information 55 may include an indication of a specific time that a particular positioning signal is expected to arrive at the UE 10. The frequency channel information 56 includes an indication of a frequency band on which the positioning signal will be transmitted by the base station. The timing information 55 and frequency channel information 56 may be used by the processor 30 of the UE 10 to control the times and frequency channels that the wireless transceiver 33 searches for the positioning signal for measurement.

The second base station information 52 and the m-th base station information 53 may include information similar to the first base station information 51, but for respective signals from respective base stations.

Figure 4:
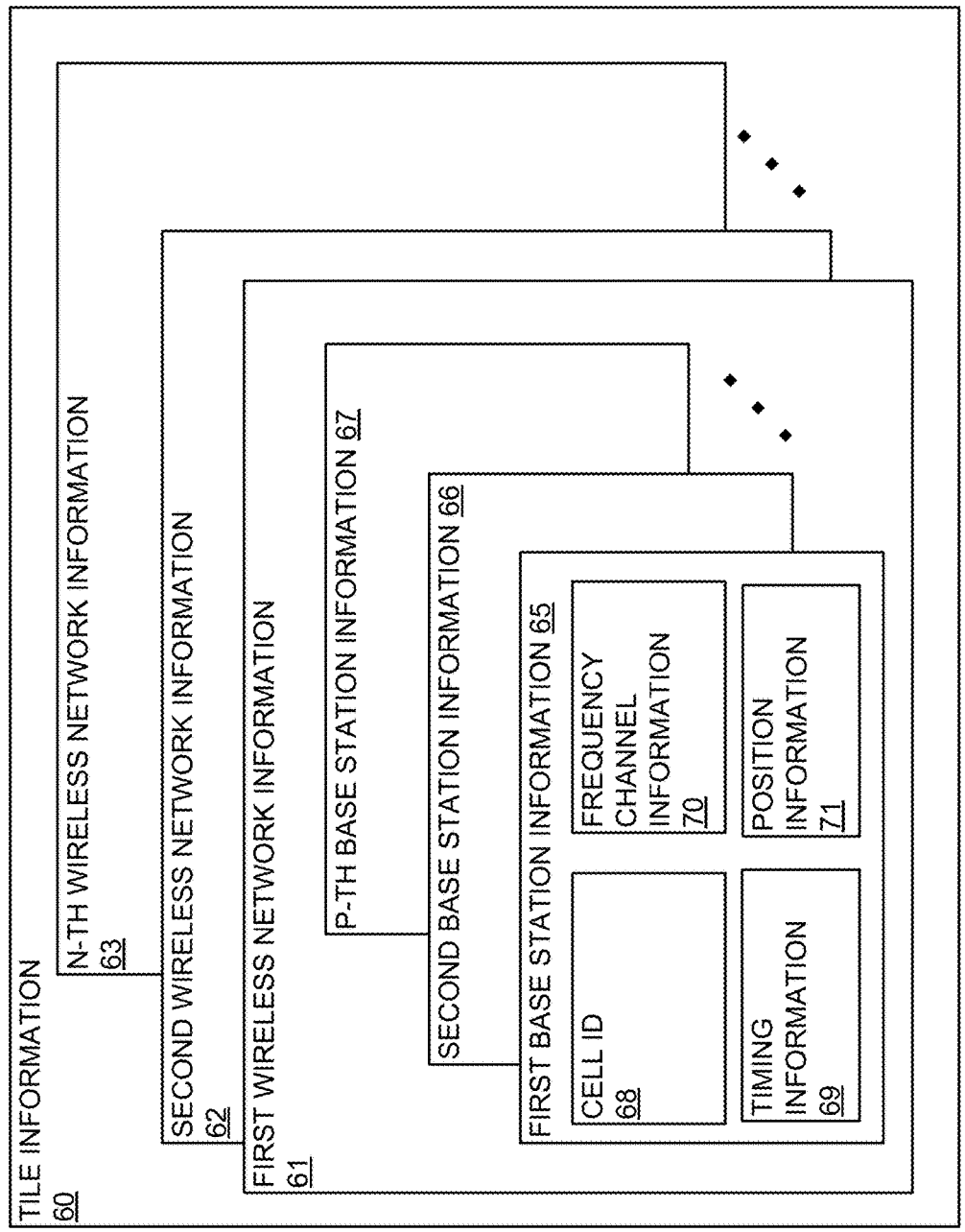
FIG. 4 is an example of tile information that may be received by the UE of FIG. 2.

Referring to FIG. 4, with further reference to FIGS. 1-3, an example of the tile information received by the wireless receiver 22 is tile information 60, which includes information for use by the UE 10 for performing one or more positioning techniques. The tile information 60 is representative of the tile information sent by the tile information server 27 and includes information about the first network 11, the second network 21, and, optionally, one or more other wireless networks. For example, the tile information 60 includes first wireless network information 61, second wireless network information 62, and n-th wireless network information 63, where n is the total number of wireless networks for which information is provided by the tile information 60. For the sake of simplicity and clarity, FIG. 4 only illustrates details for the first wireless network information 61. The information associated with the other wireless networks may be the same type of information as the first wireless network information 61, or it may be different.

The first wireless network information 61 includes information about multiple base stations of the first network 11. For example, the first wireless network information 61 includes first base station information 65, second base station information 66, and p-th base station information 67, where p is the total number of base stations of the first network 11 for which information is provided by the tile information 60. Base station information is also provided for any other base station between the second base station and the p-th base station (not shown). For the sake of simplicity and clarity, FIG. 4 only illustrates details for the first base station information 61. The information associated with the other base stations may be the same type of information as the first base station information 61, or it may be different.

The first base station information 61 includes a cell ID 68, timing information 69, frequency channel information 70, and a position information 71, but additional information may be included. An example of a cell ID 68 is an identifier that the UE 10 and the first network 11 use to identify and/or address a particular base station. The timing information 69 includes an estimate of when the UE 10 is expected to receive a positioning signal. For example, the timing information 69 may include a periodicity, a timing offset and a duration of a positioning signal emitted by the base station. Alternatively or additionally, the timing information 69 may include an indication of a specific time that a particular positioning signal is expected to arrive at the UE 10. The frequency channel information 70 includes an indication of a frequency band on which the positioning signal will be transmitted by the base station. The timing information 69 and frequency channel information 70 may be used by the processor 30 of the UE 10 to control the times and frequency channels that the wireless transceiver 33 should search for the positioning signal for measurement. The position information 71 includes an indication of the position of the base station associated with the first base station information 65. The UE 10 or the location server 15 can use the position information 71 in connection with RSTD measurements made by the UE 10, or another measurement based on the time of arrival or time difference of arrival of signals from the first signal emitter and other signal emitters, to approximate the location of the UE 10. By way of example and not limitation, the position information 71 may include a latitude value, a longitude value, and an elevation value for the base station.

The second base station information 66 and the p-th base station information 67 may include information similar to the first base station information 65, but for respective signals from respective base stations.

Returning to FIG. 2, with further reference to FIGS. 1 and 3-4, the processor 30 is configured to receive, from the location server 15, via the wireless transceiver 33, first information about a first plurality of positioning signals expected to be transmitted by a first set of base stations. By way of example and not limitation, the first set of base stations may be the base stations 12-14 of the first network 11. Additionally, the first information may include the assistance data 50, which includes timing information 55 and frequency channel information 56 for positioning signals transmitted by the base stations 12-14.

The processor 30 is further configured to receive, from the tile information server 27 via the wireless transceiver 33, second information about a second plurality of positioning signals expected to be transmitted by the second set of base stations, the second set of base stations including an additional base station not included in the first set of base stations. By way of example and not limitation, the second information may be the tile information 60, which includes information about the first set of base stations (e.g., base stations 12-14 of the first network 11) and the second set of base stations (e.g., base stations 22-25 of the second network 21). The additional base station may be one or more of the base stations 22-25. Alternatively or additionally, the additional base station may be a base station of the first network 11. For example, the location server 15 may not include information regarding every base station of the first network 11 in the assistance data 50. However, information for base stations missing from the assistance data 50 may be included in the tile information 60. The tile information may include position information about the first set of base stations and the second set of base stations.

The processor 30 is further configured to measure the third plurality of positioning signals received via the wireless transceiver 33 from a combination of a first subset of the first set of base stations and a second subset of the second set of base stations, the third plurality of positioning signals including an additional positioning signal transmitted by the additional base station. By way of example and not limitation the processor 30 may be configured to measure positioning signals received from base stations 12-14 of the first network 11 in addition to positioning signals received from one or more of the base stations 22-25 of the second network 21. Alternatively, the processor 30 may be configured to measure positioning signals received from a subset of the base stations 12-14 of the first network 11 (e.g., base station 12 and base station 13, but not base station 14) in addition to positioning signals received from one or more the base stations 22-25 of the second network 21.

The processor 30 may measure the third plurality of positioning signals by controlling the wireless transceiver 33 to perform certain measurements. For example, the wireless transceiver 33 is tunable and may be tuned to a particular frequency channel to search for a signal at a particular time (e.g., the expected time of arrival of a positioning signal). The processor 30 may be configured to control the wireless transceiver 33 to tune to a particular frequency channel at a particular time based on the information provided in the assistance data 50 and/or the tile information 60. In addition, the wireless transceiver 33 may include a clock for measuring the arrival time of the positioning signals and/or the difference between the arrival times of two or more of the positioning signals. The wireless transceiver 33 may send, via the bus 36, the information contained in the positioning signals and the timing measurements to the processor 30 and/or the memory 31. For example, the wireless transceiver 33 may be configured to measure the time of arrival for each of the third plurality of positioning signals and send the time of arrival measurement results to the processor 30. The processor 30 may be configured to receive the time of arrival measurement results for the third plurality of positioning signals and calculate the time difference of arrival for the positioning signals received from different base stations.

The processor 30 is further configured to send, via the wireless transceiver 33, measurement results for the third plurality of positioning signals to the location server 15. The measurement results may be for example RSTD measurements of the third plurality of positioning signals. The processor 30 may, for example, control the wireless transceiver 33 to transmit one or more signals to the primary base station (e.g., base station 14) of the first network 11, where information from the one or more signals will be transmitted to the location server 15.

By measuring the additional positioning signal received from the additional base station and sending the measurement results for the additional positioning signal to the location server 15, the UE 10 is sending more measurement results than the location server 15 is expecting to receive. The location server 15 expects to receive measurement results associated with the base stations included in the assistance data 50. However, despite the additional measurement results being unexpected, the location server 15 is able to use the additional measurement results to determine the location of the UE 10. The processor 30 is configured to use the tile information received from the tile information server 27 to select the additional base station from the second set of base stations for which information is included in the tile information, measure positioning signals from the additional base station, and send the measurement results for that additional base station to the location server 15. The processor 30 may select the additional base station to cure a deficiency identified in the assistance data 50. For example, as described below, the processor 30 may be configured to determine that the positioning signals received from base stations included in the assistance data 50 are likely to result in measurement results that have an error that is greater than an error threshold or performing the measurements of the positioning signals will likely take longer than a threshold duration. The processor 30 may be configured to select the additional base station (or more than one additional base station) such that the measurement error will likely no longer exceed the error threshold and/or the time it takes to perform the measurements will be less than the threshold duration. Consequently, adding a base station to the positioning technique (e.g., OTDOA) increases the available data points and thus may increase the performance and/or accuracy of the positioning technique relative to using base stations for which information is included in the assistance data 50.

The processor 30 may be configured to measure the additional positioning signal transmitted by the additional base station in response to a determination that the assistance data 50 received from the location server 15 is deficient in some way. The deficiency in the assistance data 50 may be related to the number of base stations included in the assistance data 50, the frequency channels the base stations use to transmit positioning signal, and/or the positions of the base stations.

A first non-limiting example of determining that the assistance data 50 is deficient includes the processor 30 being configured to determine the first set of base stations includes less than a threshold number of base stations. The threshold number of base stations may be determined based on a measurement capacity of the UE 10. For example, for a given duration of time, the UE 10 may be able to search for and measure a limited number of positioning signals received from multiple base stations. The number of positioning signals that the UE 10 can measure in the given time duration is an example of a measurement capacity. If the number of base stations for which positioning signals are to be measured (based on the assistance data 50 from the location server 15) is less than the measurement capacity, the processor 30 may select the additional base station from the tile information 60 and measure additional positioning signals from the additional base station. The processor 30 may select the additional base station by selecting a base station that is least likely, from among the base stations included in the tile information 60, to impact the ability of the UE 10 to measure the positioning signals received from the first set of base stations. For example, if the tile information 60 includes three possible additional base stations, but the positioning signals from two of the possible additional base stations are expected to arrive at the UE 10 (as determined from the timing information 69) at the same time as positioning signals from the first set of base stations, the processor 30 will select the one remaining possible additional base station to be the additional base station. Thus, in some implementations, the processor 30 is configured to measure the additional positioning signal in response to a determination that the first set of base stations includes less than the threshold number of base stations.

A second non-limiting example of determining that the assistance data 50 is deficient includes the processor 30 being configured to determine, using the first information (e.g., the assistance data 50 from the location server 15), that a first-channel number of base stations, of the first set of base stations, is greater than a single-channel threshold. The first-channel number is a number of base stations from the first set of base stations that are expected to transmit respective positioning signals of the first plurality of positioning signals using a first frequency channel. An example of how the assistance data 50 may be used to determine that the first-channel number of base stations exceeds the single-channel threshold includes the processor 30 being configured to use the frequency channel information 56 to determine the frequency channels on which the first set of base stations are expected to transmit the respective positioning signals. If the frequency channel information 56 indicates that the number of base stations expected to transmit positioning signals using a first frequency channel (i.e., the first-channel number of base stations) is greater than the single-channel threshold, then it may be advantageous for the UE 10 to measure positioning signals from the additional base station if the additional base station transmits positioning signals using a second frequency channel different from the first frequency channel. Receiving positioning signals that use multiple frequency channels (e.g., inter-frequency OTDOA) increases the performance of OTDOA relative to receiving positioning signals that use a single frequency because when multiple base stations transmit positioning signals with the same frequency, there is a muting pattern that reduces the number of measurements that can be made in during any particular period of time due to two or more positioning signals on the same frequency channel arriving at the UE 10 at the same time. When the number of the first set of base stations using the first frequency channel is greater than the single-channel threshold, the UE 10 takes a longer duration of time to make a particular number of measurements than if a number of the first set of base stations using the first frequency channel are replaced with an equal number of base stations using the second frequency channel. Thus, in some implementations, the processor 30 is configured to measure, and configured to control the wireless receiver 33 to measure, the additional positioning signal in response to a determination that the first-channel number is greater than the threshold.

The processor 30 may also be configured to determine, using the second information (e.g., the tile information), that the additional base station is expected to transmit the additional positioning signal using the second frequency channel that is different from the first frequency channel. For example, the processor 30 may be configured to use the frequency channel information 70 included in the tile information 60 of FIG. 4 to determine which frequency channel is used by each of the base stations for which information is included in the tile information 60. The processor 30 may further be configured to select the additional base station based on a determination that the additional base station is expected to transmit the additional positioning signal using the second frequency channel. Additionally, the processor 30 is not limited to selecting a single additional base station or multiple additional base stations that transmit positioning signals using the second frequency channel. The processor 30 may be configured to select multiple additional base stations that transmit positioning signals using multiple different frequency channels. For example, the processor 30 may select four additional base stations, two of which transmit positioning signals using the second frequency channel and two of which transmit positioning signals using a third frequency channel. As another example, the processor 30 may select four additional base stations, each of which transmits positioning signals using a frequency channel that is different from the other additional base stations and different from the first frequency channel.

A third non-limiting example of determining that the assistance data 50 is deficient includes, the processor 30 being configured to determine that a location-error estimate based on the first set of base stations is greater than a threshold error value. The location-error estimate is an estimate of the error that will likely result from determining the location of the UE 10 based on a particular arrangement of base stations. The location-error estimate may be calculated for any set of base stations based on the location of each of the base stations in the set of base stations. An example of the location-error estimate is a geometrical dilution of precision (GDOP), which is a measure of location error that depends on the position of the UE 10 relative to the geometry (e.g., the relative locations) of the base stations expected to be used to determine the location of the UE 10. The total location error is the location error that results from performing RSTD measurements using a particular set of base stations, and is a function of the GDOP and the error in the time of arrival measurements made by the UE 10. As an example, the location-error estimate may be calculated for the first set of base stations (e.g., the base stations for which information was included in the assistance data 50) if the location of each of the first set of base stations is known. The location of each of the first set of base stations, however, is not included in the assistance data 50. But the tile information 60 may include the location of each of the first set of base stations. Accordingly, the processor 30 may be configured to obtain a respective location of each base station of the first set of base stations and configured to determine the location-error estimate based on the respective location of each base station of the first set of base stations. For example, the respective location of each base station of the first set of base stations may be acquired from the tile information 60, which includes the position information 71 for the first set of base stations as well as the second set of base stations. Based on the position information 71, the UE 10 may calculate the expected GDOP for the first set of base stations.

Figure 5:
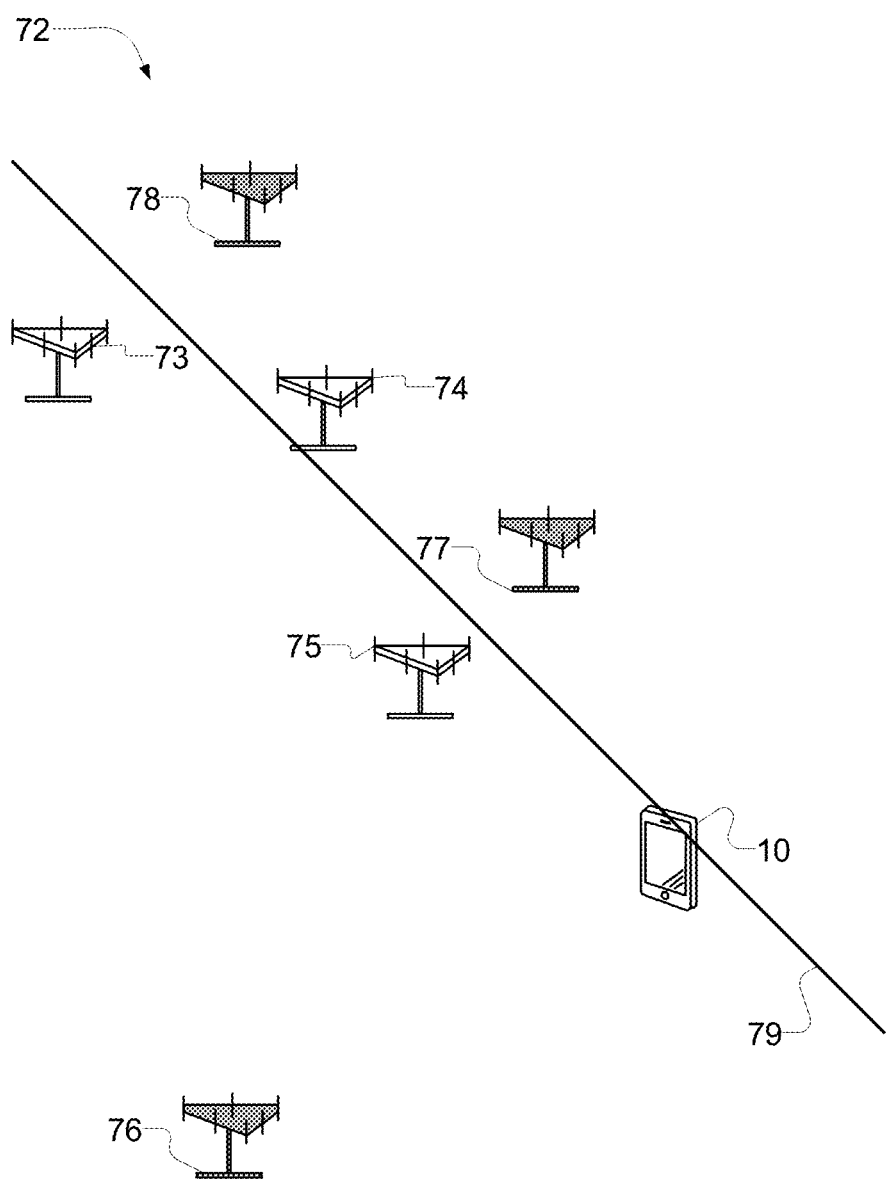
FIG. 5 is a simplified diagram of an example communications environment with a particular geometry of five base stations.

An example of determining that a location-error estimate based on the first set of base stations is greater than a threshold error value is described with reference to FIG. 5, with further reference to FIGS. 1-4, which shows the UE 10 located at a particular position relative to base stations 73-78 within an example communications environment 72. The base stations 73-75 (in this example, the first set of base stations) are base stations for which information was included in the assistance data 50 received by the UE 10. The base stations 76-78 (in this example, the second set of base stations) are base stations for which information was not included in the assistance data 50, but information for base stations 76-78 was included in the tile information 60 received by the UE. Base stations 76-78 may be referred to as the possible additional base stations because they are base stations that are available to be selected by the UE 10 as the additional base station. Position information 71 for each of the base stations 73-78 was also included in the tile information 60. The processor 30 of the UE 10 is configured to calculate the location-error estimate for the three base stations 73-75. Because the three base stations 73-75 are located approximately along a line 79 with the UE 10, the location-error estimate is larger than it would be in a situation where the UE 10 is near the center of three base stations that are not located along the line 79. The processor 30 is configured to compare the calculated location-error estimate for the three base stations 73-75 to the threshold error value. If the calculated location-error estimate is greater than the threshold error value, the processor 30 measures positioning signals from the additional base station, which may include one or more of the base station 76-79.

The processor 30 may be configured to obtain a respective location of each base station of the second set of base stations and determine multiple alternative location-error estimates based on the respective location of each base station of the first set of base stations and the respective location of each base station of the second set of base stations. Each alternative location-error estimate of the plurality of alternative location-error estimates is associated with a respective set of base stations, and each of the base stations in each of the respective set of base stations is from the first set of base stations or from the second set of base stations. For example, the processor 30 may be configured to determine alternative location-error estimates using the locations of the first set of base stations in addition to the locations of the second set of base stations. An alternative location-error estimate may be calculated for each base station of the second set of base stations. For example, returning to the example communication environment 72 of FIG. 5, the second set of stations includes a first possible additional base station 76, a second possible additional base station 77 and a third possible additional station 79. The processor 30 is configured to obtain the locations of the base stations 76-78 from the position information 71 of the tile information 60. The processor 30 uses the position information 71 to determine multiple alternative location-error estimates associated with different sets of base stations with the goal of identifying at least one additional base station that will decrease the location-error estimate for the UE 10. For example, the processor 30 may us the position information 71 to calculate three alternative location-error estimates based on using one additional base station: a first alternative location-error estimate based on the locations of the first set of base stations 73-75 and the location of the first possible additional base station 76; a second alternative location-error estimate based on the locations of the first set of base stations 73-75 and the location of the second additional base station 77; and a third alternative location-error estimate based on the locations of the first set of base stations 73-75 and the location of the third additional base station 78. Additionally, the processor 30 may be configured to calculate three additional alternative location-error estimates based on using two additional base stations: a fourth alternative location-error estimate based on the locations of the first set of base stations 73-75 and the locations of the first possible additional base station 76 and the second possible additional base station 77; a fifth alternative location-error estimate based on the locations of the first set of base stations 73-75 and the locations of the first possible additional base station 76 and the third possible additional base station 78; and a sixth alternative location-error estimate based on the locations of the first set of base stations 73-75 and the locations of the second possible additional base station 77 and the third possible additional base station 78. All or some of the six alternative location-error estimates may be used to select the additional base station from which positioning signals will be measured by the UE 10.

The processor 30 may be configured to select the additional base station based on an alternative location-error estimate, which is associated with the first set of base stations and the at least one possible additional base station, being less than other alternative location-error estimates, which are associated with respective sets of base stations that include equal numbers of base stations as a number of base stations in the first set of base stations plus a number of the at least one additional base station. For example, the aforementioned first, second, and third alternative location-error estimates may be compared to each other to determine which of the three alternative location-error estimates has the smallest value. The alternative location-error estimate with the smallest value is associated with a particular additional base station. For example, the first alternative location-error estimate is less than the second alternative location-error estimate and the third alternative location-error estimate because the base station 76 and the base station 77 are located approximately along the line 79 and the base station 76 is located relatively far from the line 78. The processor 30 is configured to select the possible additional base station 76 as the additional base station for which positioning signals will be measured. Note that the first, second, and third alternative location-error estimates, which are based on using one additional base station, are not compared to the fourth, fifth, and sixth alternative location-error estimates, which are based on using two additional base stations, because they have a different total number of base stations. Adding additional base stations to a location-error calculation (e.g., a GDOP calculation) always results in reduced error. Therefore, only alternative location-error estimates based on equal number of base stations are compared.

The processor 30 may be configured to compare the alternative location-error estimate with the smallest value to the threshold error value. If the smallest alternative location-error estimate is not less than the threshold error value then a number of additional base stations used in the calculation of the alternative location-error estimates is increased. For example, the processor 30 may be configured to compare the first alternative location-error estimate, which is the smallest of the first, second, and third alternative location-error estimates (based on adding one additional base station), to the threshold error value. If the first alternative location-error estimate is less than the threshold error value, then the processor 30 proceeds to making the measurements of the positioning signals received from the base stations 73-76. If, however, the first alternative location-error estimate is greater than the threshold error value, then the processor 30 may determine whether the fourth, fifth, or sixth alternative location-error estimates, which are based on adding two additional base stations, are less than the threshold. When the processor 30 identifies an alternative location-error estimate less than the threshold error value, then the additional base stations associated with the identified alternative location-error estimate is selected as the additional base stations for which positioning signals will be measured by the UE 10.

Figure 6:
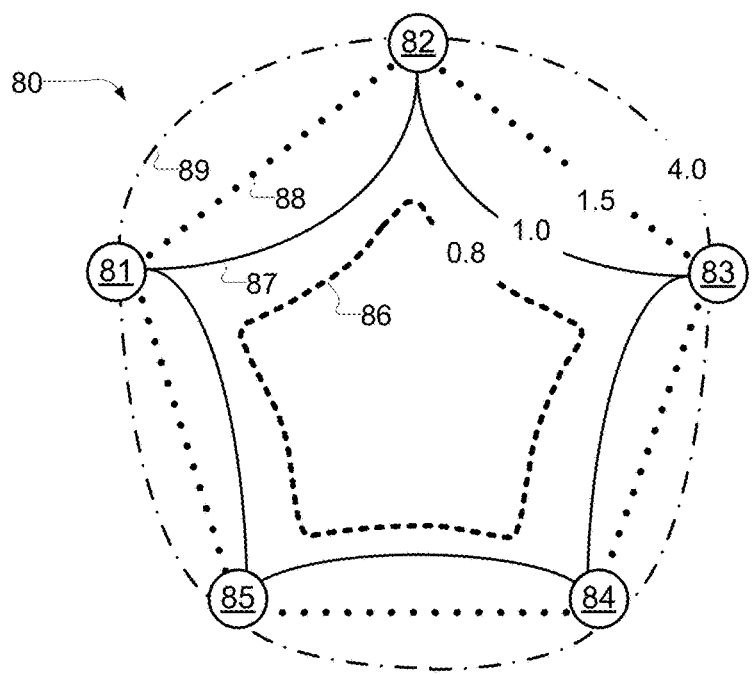
FIG. 6 is a diagram illustrating an example location error estimate for a particular geometry of five base stations.

Referring to FIG. 6, an environment 80 that includes a set of five base stations 81-85 arranged as shown provides a GDOP that varies as a function of position within the environment 80 as shown. The GDOP for the particular arrangement illustrated in FIG. 5 decreases for positions approaching a center of the five base stations 81-85 and increases for positions farther away from the center of the five base stations 81-85. The four different lines plotted as a function of position in the environment 80 represent contour lines of constant GDOP. A first contour line 86 (illustrated with dashed line) represents positions within the environment 80 where the GDOP has a value of 0.8. A second contour line 87 (illustrated with a solid line) represents locations within the environment 80 where the GDOP has a value of 1.0. A third contour line 88 (illustrated with a dotted line) represents locations within the environment 80 where the GDOP has a value of 1.5. A fourth contour line 89 (illustrated with a dash-dot line) represents locations within the environment 80 where the GDOP has a value of 4.0.

Figure 7:
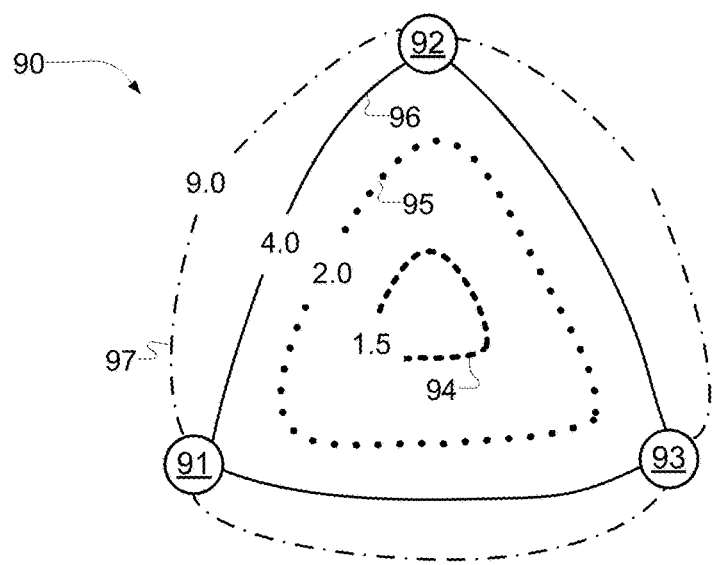
FIG. 7 is a diagram illustrating an example location error estimate for a particular geometry of three base stations.

Referring to FIG. 7, an environment 90 that includes a set of three base stations 91-93 arranged as shown provides a GDOP that varies as a function of position within the environment 90 as shown. The GDOP for the particular arrangement illustrated in FIG. 6 decreases for positions approaching a center of the three base stations 91-93 and increases for positions farther away from the center of the three base stations 91-93. The four different lines plotted as a function of location in the environment 90 represent contour lines of constant GDOP. A first contour line 94 (illustrated with dashed line) represents locations within the environment 90 where the GDOP has a value of 1.5. A second contour line 95 (illustrated with a dotted line) represents locations within the environment 90 where the GDOP has a value of 2.0. A third contour line 96 (illustrated with a solid line) represents locations within the environment 90 where the GDOP has a value of 4.0. A fourth contour line 97 (illustrated with a dash-dot line) represents locations within the environment 90 where the GDOP has a value of 9.0. For example, the third contour line 96 of FIG. 6, which is the contour line that is nearly a straight line between two adjacent base stations, is associated with a GDOP of 4.0, whereas the third contour line 88 of FIG. 5, which is also the contour line that is nearly a straight line between two adjacent base stations, is associated with a GDOP of 1.5.

Figure 8:
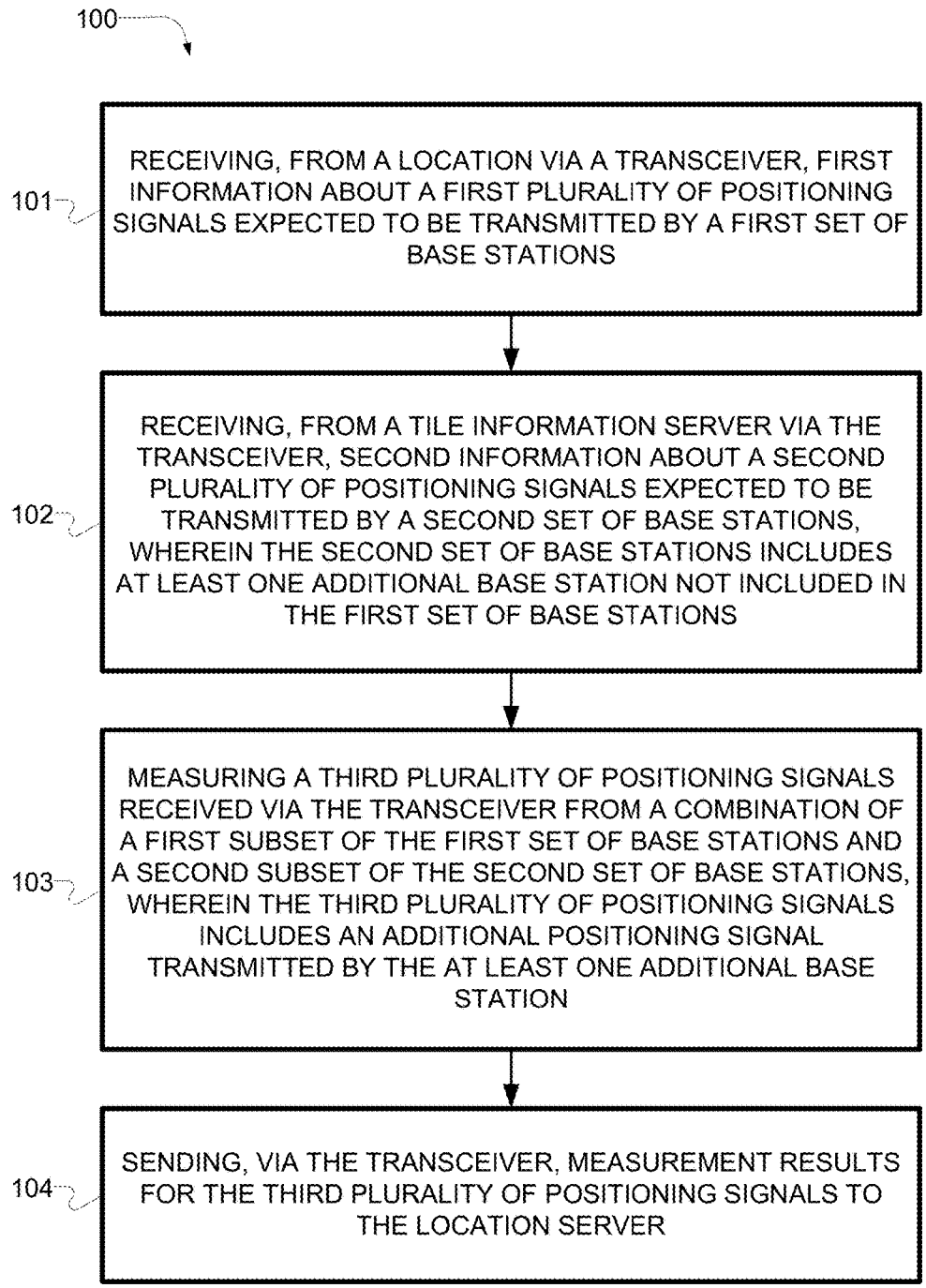
FIG. 8 is a flow diagram of an example method of operating the UE of FIG. 2.

Referring to FIG. 8, with further reference to FIGS. 1-7, a method 100 of operating a UE, such as the UE 10, includes the stages shown. The method 100 is, however, an example only and not limiting. The method 100 can be altered, e.g., by having stages added, removed, rearranged, combined, performed concurrently, and/or having single stages split into multiple stages.

At stage 101, the method 100 includes receiving, from a location server via a transceiver, first information about a first plurality of positioning signals expected to be transmitted by a first set of base stations. For example, the location server 15 may send the first information to the UE 10 which receives the first information via the transceiver 33. The first information may be encoded in wireless signals 35 received by the antenna 34 and the wireless transceiver 33. The first information may be received by the processor 30 and/or the memory 31 via the bus 36 from the wireless transceiver 33. The first information may include assistance data 50 that the UE 10 uses to perform one or more positioning techniques.

The assistance data 50 include, for example information about positioning signals that the UE 10 is expected to receive from base stations of the first network 11, but does not include information about positioning signals transmitted by base stations of the second network 21 or any other network. Examples of the type of information included in the assistance data 50 include an indication of the identity of each base station for which information is provided, an indication of the frequency channel that each base station will use to send the positioning signals, and an indication of the time at which the positioning signals are expected to be received by the UE 10 from the base stations.

At stage 102, the method 100 includes receiving, from a tile information server via the transceiver, second information about a second plurality of positioning signals expected to be transmitted by a second set of base stations, the second set of base stations including an additional base station not included in the first set of base stations. The second information may be encoded in wireless signals 35 received by the antenna 34 and the wireless transceiver 33. The second information may then be received by the processor 30 and/or the memory 31 via the bus 36 from the wireless transceiver 33. The second information may include tile information 60, which includes information about positioning signals transmitted by the second set of base stations and/or information about the second set of base stations. The second set of base stations may be base stations of a single wireless network, or the second set of base stations may be base stations of multiple wireless networks. For example, the tile information 60 may include information about base stations 12-14 of the first network 11 and base stations 22-25 of the second network 21. The UE 10 may receive tile information 60 for more than one tile. The UE 10 receives tile information 60 from the tile in which the UE 10 is located, as well as the neighboring tiles adjacent to the tile in which the UE 10 is located. Examples of the type of information included in the tile information 60 includes an indication of the identity of each base station within a particular tile, an indication of the frequency channel that each base station will use to send the positioning signals, an indication of the time at which the positioning signals are expected to be received by the UE 10 from the base stations, and the location of each of the base stations.

At stage 103, the method 100 includes measuring a third plurality of positioning signals received via the transceiver from a combination of a first subset of the first set of base stations and a second subset of the second set of base stations, the third plurality of positioning signals including an additional positioning signal transmitted by the additional base station. By way of example and not limitation the processor 30 may measure positioning signals received from base stations 12-14 of the first network 11 in addition to positioning signals received from one or more of the base stations 22-25 of the second network 21. Alternatively, the processor 30 may measure positioning signals received from a subset of the base stations 12-14 of the first network 11 (e.g., base station 12 and base station 13, but not base station 14) in addition to positioning signals received from one or more the base stations 22-25 of the second network 21.

The processor 30 may measure the additional positioning signal transmitted by the additional base station in response to a determination that the assistance data 50 received from the location server 15 is deficient in some way. The deficiency in the assistance data 50 may be related to the number of base stations included in the assistance data 50, the frequency channels the base stations use to transmit positioning signal, and/or the positions of the base stations.

A first example of determining that the assistance data 50 is deficient includes determining, using the processor 30, that the first set of base stations includes less than a threshold number of base stations. The threshold number of base stations may be based on a measurement capacity of the UE 10. Measuring additional positioning signals from the additional base station may increase the accuracy of the positioning technique. For example, if the number of base stations the UE 10 is expected to measure based on the information included in the assistance data 50 is less than the measurement capacity, the processor 30 may select one or more additional base stations from the tile information to measure. The processor 30 may select a number of additional base stations such that the measurement capacity of the UE 10 is reached, but not exceeded. Thus, in some implementations, the method may include measuring, using the processor 30, the additional positioning signal in response to a determination that the first set of base stations includes less than the threshold number of base stations.

A second example of determining that the assistance data 50 is deficient includes determining, using the processor 30 and the first information (e.g., the assistance data 50 from the location server 15), that a first-channel number of base stations of the first set of base stations that are expected to transmit respective positioning signals of the first plurality of positioning signals using a first frequency channel is greater than a threshold. For example, the frequency channel information 56 of the assistance data 50 may be used to determine the frequency channels that the base stations for which base station information is included in the assistance data 50 are expected to transmit the respective positioning signals. If the frequency channel information 56 indicates that the number of base stations expected to transmit positioning signals using a first frequency channel (i.e., the first-channel number of base stations) is greater than the threshold number, then the processor 30 may measure positioning signals from the additional base station if the additional base station transmits positioning signals using a second frequency channel different from the first frequency channel. Thus, in some implementations, the processor 30 selects the additional base station for measurement based on a determination that the additional base station is expected to transmit the additional positioning signal using the second frequency channel and measures the additional positioning signal in response to a determination that the first-channel number is greater than the threshold. The processor 30 may use the second information (e.g., the tile information) to determine that the additional base station is expected to transmit the additional positioning signal using the second frequency channel that is different from the first frequency channel.

A third example of determining that the assistance data 50 is deficient includes determining, using the processor 30, that a location-error estimate based on the first set of base stations is greater than a threshold error value. The location-error estimate is an estimate of the error that will likely result from a determining the location of the UE 10 based on a particular arrangement of base stations. An example of the location-error estimate is the GDOP. The processor 30 may obtain a respective location of each base station of the first set of base stations and determine the location-error estimate based on the respective location of each base station of the first set of base stations. For example, calculating the expected GDOP for the first set of base stations may be performed by the processor 30 based on the position information 71 that is included in the received tile information 60.

The processor 30 may obtain a respective location of each base station of the second set of base stations and determine multiple alternative location-error estimates based on the respective location of each base station of the first set of base stations and the respective location of each base station of the second set of base stations. Each alternative location-error estimate of the plurality of alternative location-error estimates is associated with a respective set of base stations, and each of the base stations in each of the respective set of base stations is from the first set of base stations or from the second set of base stations. The processor 30 may determine alternative location-error estimates for each base station of the second set of base stations using the locations of the first set of base stations in addition to the locations of the second set of base stations. For example, the second set of base stations includes the first possible additional base station 76, the second possible additional base station 77 and the third possible additional station 79. The processor 30 obtains the locations of the base stations 76-78 from the position information 71 of the tile information 60. The processor 30 uses the position information 71 to determine multiple alternative location-error estimates associated with different sets of base stations with the goal of identifying at least one additional base station that will decrease the location-error estimate for the UE 10. For example, the processor 30 may use the position information 71 to calculate three alternative location-error estimates based on using one additional base station: a first alternative location-error estimate based on the locations of the first set of base stations 73-75 and the location of the first possible additional base station 76; a second alternative location-error estimate based on the locations of the first set of base stations 73-75 and the location of the second additional base station 77; and a third alternative location-error estimate based on the locations of the first set of base stations 73-75 and the location of the third additional base station 78. Additionally, the processor 30 may be configured to calculate three additional alternative location-error estimates based on using two additional base stations: a fourth alternative location-error estimate based on the locations of the first set of base stations 73-75 and the locations of the first possible additional base station 76 and the second possible additional base station 77; a fifth alternative location-error estimate based on the locations of the first set of base stations 73-75 and the locations of the first possible additional base station 76 and the third possible additional base station 78; and a sixth alternative location-error estimate based on the locations of the first set of base stations 73-75 and the locations of the second possible additional base station 77 and the third possible additional base station 78. All or some of the six alternative location-error estimates may be used to select the additional base station from which positioning signals will be measured by the UE 10.

The processor 30 may select the additional base station based on an alternative location-error estimate, that is associated with the first set of base stations and the at least one possible additional base station, being less than other alternative location-error estimates associated with respective sets of base stations that include equal numbers of base stations as a number of base stations in the first set of base stations plus a number of the at least one additional base station. For example, the aforementioned first, second, and third alternative location-error estimates may be compared to each other to determine which of the three alternative location-error estimates has the smallest value. The alternative location-error estimate with the smallest value is associated with a particular additional base station. That additional base station is selected as the additional base station for which positioning signals will be measured. Alternative location-error estimates based on equal number of base stations are compared to one another, but alternative location-error estimates based on unequal numbers of base station are not compared because adding base stations always results in a reduced error.

The alternative location-error estimate with the smallest value may be compared to the threshold error value. If the smallest alternative location-error estimate is not less than threshold error value then the number of additional base stations used in the calculation of the alternative location-error estimates is increased. For example, the processor 30 may compare the smallest alternative location-error estimate (e.g., based on adding one additional base station and using the base stations 73-76) to the threshold error value. If the first alternative location-error estimate is less than the threshold error value, then the processor 30 proceeds to making the measurements of the positioning signals received from the base stations 73-76. If the smallest alternative location-error estimate is not less than the threshold error value, then the processor 30 may determine whether the fourth, fifth, or sixth alternative location-error estimates, which are based on adding two additional base stations, are less than the threshold error value. When the processor 30 identifies an alternative location-error estimate less than the threshold error value, then the additional base stations associated with the identified alternative location-error estimate is selected as the additional base stations for which positioning signals will be measured by the UE 10.

At stage 104, the method 100 includes sending, via the transceiver 33, measurement results for the third plurality of positioning signals to the location server 15. The measurement results may be, for example, RSTD measurements of the third plurality of positioning signals and the positioning signals may be PRS or CRS signals. The UE 10 sends measurement results for positioning signals received from a base station that was not included in the assistance data provided by the location server 15 to the location server 15.

In some implementations, position information used to determine the position of a particular UE such as UE 10 may include assistance information alone at a first time, a mix of assistance information and tile information at a second different time, and optionally tile information alone at a third different time. For example, at the first time the UE 10 may access assistance information provided by location server 15 and use the assistance information to search for positioning signals from a plurality of base stations whose assistance information is included in the information provided by the location server 15 (a "first set" of base stations). UE 10 may make positioning measurements based on detection of the positioning signals, and its position then determined at UE 10 or server 15 or 26 using the positioning measurements (e.g., using a TDP, OTDOA, or other downlink positioning technique as described above).

There are a number of reasons why UE 10 may use only assistance information at the first time. It may be that assistance information is available for a number of base stations proximate to the UE 10 that is sufficient to fully utilize the searcher capacity of UE 10, that a position quality for the UE is sufficient using assistance information alone, that tile information is currently unavailable or some combination. In some implementations, the circumstances in which UE 10 uses only assistance information may be based on the type of positioning environment for UE 10 at the first time. For example, the UE may use assistance information alone if it is determined that it is in a low multi-path environment versus a high multi-path environment, or similarly in an outdoor positioning environment versus an indoor environment. The circumstances outlined above are not exclusive, and combinations of the above circumstances may be used to determine to use assistance information alone.

At the second time, circumstances may have changed so that the addition of tile information may be used for positioning UE 10. For example, UE 10 may have moved to a more challenging positioning environment; for example, to an indoor environment from an outdoor environment or from a low multi-path environment to a higher multi-path environment. In a more challenging positioning environment, information from more base stations may be needed to provide the desired position quality. In another example, UE 10 may have moved from an environment in which it was using its full searcher capacity to an environment where the number of base stations in the first set of base stations is lower so that it has excess searcher capacity, or may have moved from a position where the geometric distribution of base stations in the first set provided the desired position quality to a position where the position quality is lower than desired. In response to such a change, UE 10 may access tile information to augment the assistance information. UE 10 may access tile information that is already stored at UE 10 (for example, based on prior reception of the tile information from tile information server 27), tile information may automatically be sent to UE 10 from tile information server 27 based on one or more indicators (for example, based on a determination that UE 10 was going to be entering a challenging positioning environment such as an indoor or urban canyon environment or a determination that the number and/or placement of base stations of the first set may not provide adequate position quality), or UE 10 may request and subsequently receive tile information from tile information server 27.

As noted above, each tile includes base station information for a particular geographic region (a "second set of base stations") and is not restricted to base stations from a particular network. UE 10 accesses information for its current tile, and may access information for one or more proximate tiles, such as the eight tiles adjacent to the current tile or in some cases tiles beyond those. For example, UE 10 may access tile information for its current tile and one to eight of the adjacent tiles, and use the base station information to augment the available assistance information. Tile information for particular base stations of the tiles may be selected in order to enhance position quality. For example, rather than using information for all of the base stations whose information is included in a particular tile, information for a subset that provides enhanced GDOP may be used. Note that there is generally overlap between the first set of base stations whose information is included in the assistance information and the second set of base stations whose information is included in the tile information.

UE 10 uses the assistance and tile information to detect positioning signals using its searcher, and to obtain positioning measurements for a downlink positioning technique based on the detection. UE 10 may then send the measurements to a server for location determination using (for example) multilateration positioning techniques. Alternatively, UE 10 may determine the position using the positioning measurements rather than sending measurements to a server (e.g., in a TDP technique).

In some circumstances, UE 10 may optionally use tile information alone to detect positioning signals and obtain positioning measurements. For example, at the third time UE 10 may not have access to assistance information from a location server, but may have access to tile information.

OTHER CONSIDERATIONS

Other examples and implementations are within the scope and spirit of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

Also, as used herein, "or" as used in a list of items prefaced by "at least one of" or prefaced by "one or more of" indicates a disjunctive list such that, for example, a list of "at least one of A, B, or C," or a list of "one or more of A, B, or C," or "A, B, or C, or a combination thereof" means A or B or C or AB or AC or BC or ABC (i.e., A and B and C), or combinations with more than one feature (e.g., AA, AAB, ABBC, etc.).

As used herein, unless otherwise stated, a statement that a function or operation is "based on" an item or condition means that the function or operation is based on the stated item or condition and may be based on one or more items and/or conditions in addition to the stated item or condition.

Further, an indication that information is sent or transmitted, or a statement of sending or transmitting information, "to" an entity does not require completion of the communication. Such indications or statements include situations where the information is conveyed from a sending entity but does not reach an intended recipient of the information. The intended recipient, even if not actually receiving the information, may still be referred to as a receiving entity, e.g., a receiving execution environment. Further, an entity that is configured to send or transmit information "to" an intended recipient is not required to be configured to complete the delivery of the information to the intended recipient. For example, the entity may provide the information, with an indication of the intended recipient, to another entity that is capable of forwarding the information along with an indication of the intended recipient.

A wireless network is a communications network in which communications are conveyed wirelessly, i.e., by electromagnetic and/or acoustic waves propagating through atmospheric space rather than through a wire or other physical connection. A wireless network may not have all communications transmitted wirelessly, but is configured to have at least some communications transmitted wirelessly. Further, the "user equipment," "mobile device" or similar terms, does not require that the functionality of the device is exclusively, or evenly primarily, for communication, or that the device be of a particular size or mobility, but indicates that the device includes wireless communication capability (one-way or two-way), e.g., includes at least one radio (each radio being part of a transmitter, receiver, or transceiver) for wireless communication.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium," "processor-readable storage medium," and "computer-readable medium," as used herein, refers to a medium that participates in providing data that causes a machine to operate in a specific fashion, but does not refer to transitory propagating signals. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, some operations may be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform one or more of the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above or greater than) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Further, more than one invention may be disclosed.

What is claimed is:

1. A method of operating a user equipment (UE), the method comprising:
   receiving, from a location server via a transceiver, first information about a first plurality of positioning signals expected to be transmitted by a first set of base stations;
   receiving, from a tile information server via the transceiver, second information about a second plurality of positioning signals expected to be transmitted by a second set of base stations, wherein the second set of base stations includes at least one additional base station not included in the first set of base stations;
   measuring a third plurality of positioning signals received via the transceiver from a combination of a first subset of the first set of base stations and a second subset of the second set of base stations, wherein the third plurality of positioning signals includes an additional positioning signal transmitted by the at least one additional base station; and
   sending, via the transceiver, measurement results for the third plurality of positioning signals to the location server.

2. The method of claim 1, further comprising determining, using a processor of the UE, that a location-error estimate based on the first set of base stations is greater than a threshold error value, wherein the measuring the additional positioning signal occurs in response to the determining that the location-measurement precision estimate based on the first set of base stations is greater than the threshold error value.

3. The method of claim 2, further comprising:
   obtaining a respective location of each base station of the first set of base stations; and determining the location-error estimate based on the respective location of each base station of the first set of base stations.

4. The method of claim 3, wherein the method further comprises:
obtaining a respective location of each base station of the second set of base stations;
determining a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and
selecting the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

5. The method of claim 1, further comprising determining, using a processor of the UE, that the first set of base stations includes less than a threshold number of base stations, wherein the measuring the additional positioning signal occurs in response to the determining that the first set of base stations includes less than the threshold number of base stations.

6. The method of claim 5, further comprising determining the threshold number of base stations based on a measurement capacity of the UE.

7. The method of claim 1, further comprising determining, using a processor of the UE and the first information, that a first-channel number of base stations, of the first set of base stations, that are expected to transmit respective positioning signals of the first plurality of positioning signals using a first frequency channel is greater than a single-channel threshold, wherein the measuring the additional positioning signal occurs in response to the determining that the first-channel number is greater than the single-channel threshold.

8. The method of claim 7, further comprising:
determining, using the processor of the UE and the second information, that the at least one additional base station is expected to transmit the additional positioning signal using a second frequency channel that is different from the first frequency channel; and
selecting the at least one additional base station based on the determining that the additional base station is expected to transmit the additional positioning signal using the second frequency channel.

9. A user equipment (UE) comprising:
a transceiver configured to:
receive first signals from a first set of base stations and a second set of base stations; and
send second signals to the first set of base stations and the second set of base stations; and
a processor, communicatively coupled to the transceiver, configured to:
receive, from a location server via the transceiver, first information about a first plurality of positioning signals expected to be transmitted by the first set of base stations;
receive, from a tile information server via the transceiver, second information about a second plurality of positioning signals expected to be transmitted by the second set of base stations, wherein the second set of base stations includes at least one additional base station not included in the first set of base stations;
measure a third plurality of positioning signals received via the transceiver from a combination of a first subset of the first set of base stations and a second subset of the second set of base stations, wherein the third plurality of positioning signals includes an additional positioning signal transmitted by the at least one additional base station; and
send, via the transceiver, measurement results for the third plurality of positioning signals to the location server.

10. The UE of claim 9, wherein the processor is configured to:
determine that a location-error estimate based on the first set of base stations is greater than a threshold error value; and
measure the additional positioning signal in response to a determination that the location-measurement precision estimate based on the first set of base stations is greater than the threshold error value.

11. The UE of claim 10, wherein the processor is configured to:
obtain a respective location of each base station of the first set of base stations; and
determine the location-error estimate based on the respective location of each base station of the first set of base stations.

12. The UE of claim 11, wherein the processor is configured to:
obtain a respective location of each base station of the second set of base stations;
determine a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and
select the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

13. The UE of claim 9, wherein the processor is configured to:
determine that the first set of base stations includes less than a threshold number of base stations; and
measure the additional positioning signal in response to a determination that the first set of base stations includes less than the threshold number of base stations.

14. The UE of claim 13, wherein the processor is configured to determine the threshold number of base stations based on a measurement capacity of the UE.

15. The UE of claim 9, wherein the processor is configured to:
  determine, using the first information, that a first-channel number of base stations, of the first set of base stations, that are expected to transmit respective positioning signals of the first plurality of positioning signals using a first frequency channel is greater than a single-channel threshold; and
  measure the additional positioning signal in response to a determination that the first-channel number is greater than the single-channel threshold.

16. The UE of claim 15, wherein the processor is configured to:
  determine, using the second information, that the at least one additional base station is expected to transmit the additional positioning signal using a second frequency channel that is different from the first frequency channel; and
  select the at least one additional base station based on a determination that the at least one additional base station is expected to transmit the additional positioning signal using the second frequency channel.

17. A user equipment (UE) comprising:
  means for receiving, from a location server, first information about a first plurality of positioning signals expected to be transmitted by a first set of base stations;
  means for receiving, from a tile information server, second information about a second plurality of positioning signals expected to be transmitted by a second set of base stations, wherein the second set of base stations includes at least one additional base station not included in the first set of base stations;
  means for measuring a third plurality of positioning signals received from a combination of a first subset of the first set of base stations and a second subset of the second set of base stations, wherein the third plurality of positioning signals includes an additional positioning signal transmitted by the at least one additional base station; and
  means for sending measurement results for the third plurality of positioning signals to the location server.

18. The UE of claim 17, further comprising:
  means for determining that a location-error estimate based on the first set of base stations is greater than a threshold error value; and
  means for measuring the additional positioning signal in response to a determination that the location-measurement precision estimate based on the first set of base stations is greater than the threshold error value.

19. The UE of claim 18, further comprising:
  means for obtaining a respective location of each base station of the first set of base stations; and
  means for determining the location-error estimate based on the respective location of each base station of the first set of base stations.

20. The UE of claim 19, wherein the UE further comprises:
  means for obtaining a respective location of each base station of the second set of base stations;
  means for determining a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and
  means for selecting the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

21. The UE of claim 17, further comprising:
  means for determining that the first set of base stations includes less than a threshold number of base stations; and
  means for measuring the additional positioning signal in response to a determination that the first set of base stations includes less than the threshold number of base stations.

22. The UE of claim 21, further comprising means for determining the threshold number of base stations based on a measurement capacity of the UE.

23. The UE of claim 17, further comprising:
  means for determining, using the first information, that a first-channel number of base stations, of the first set of base stations, that are expected to transmit respective positioning signals of the first plurality of positioning signals using a first frequency channel is greater than a single-channel threshold; and
  means for measuring the additional positioning signal in response to a determination that the first-channel number is greater than the single-channel threshold.

24. The UE of claim 23, further comprising:
  means for determining, using the second information, that the at least one additional base station is expected to transmit the additional positioning signal using a second frequency channel that is different from the first frequency channel; and
  means for selecting the at least one additional base station based on a determination that the at least one additional base station is expected to transmit the additional positioning signal using the second frequency channel.

25. A non-transitory, processor-readable storage medium comprising processor-readable instructions configured to cause a processor of a user equipment (UE) to:
  receive, from a location server via a transceiver of the UE, first information about a first plurality of positioning signals expected to be transmitted by a first set of base stations;
  receive, from a tile information server via the transceiver, second information about a second plurality of positioning signals expected to be transmitted by a second set of base stations, wherein the second set of base stations includes at least one additional base station not included in the first set of base stations;
  measure a third plurality of positioning signals received via the transceiver from a combination of a first subset of the first set of base stations and a second subset of the second set of base stations, wherein the third plurality of positioning signals includes an additional positioning signal transmitted by the at least one additional base station; and
  send measurement results for the third plurality of positioning signals to the location server.

26. The non-transitory, processor-readable storage medium of claim 25, further comprising instructions configured to cause the processor to:
  determine that a location-error estimate based on the first set of base stations is greater than a threshold error value; and
  measure the additional positioning signal in response to a determination that the location-measurement precision estimate based on the first set of base stations is greater than the threshold error value.

27. The non-transitory, processor-readable storage medium of claim 26, further comprising instructions configured to cause the processor to:
  obtain a respective location of each base station of the first set of base stations; and
  determine the location-error estimate based on the respective location of each base station of the first set of base stations.

28. The non-transitory, processor-readable storage medium of claim 27, wherein the non-transitory, processor-readable storage medium further comprises instructions configured to cause the processor to:
  obtain a respective location of each base station of the second set of base stations;
  determine a plurality of alternative location-error estimates based on the respective location of each base station of the first set of base stations and the respective location of each base station of the second set of base stations, each alternative location-error estimate of the plurality of alternative location-error estimates being associated with a respective set of base stations, each of the base stations in each of the respective set of base stations being from the first set of base stations or from the second set of base stations; and
  select the at least one additional base station based on an alternative location-error estimate, that is associated with the first set of base stations and the at least one additional base station, being less than other alternative location-error estimates associated with respective sets of base stations that include equal numbers of base stations as a number of base stations in the first set of base stations plus a number of the at least one additional base station.

29. The non-transitory, processor-readable storage medium of claim 25, further comprising instructions configured to cause the processor to:
  determine that the first set of base stations includes less than a threshold number of base stations; and
  measure the additional positioning signal in response to a determination that the first set of base stations includes less than the threshold number of base stations.

30. The non-transitory, processor-readable storage medium of claim 29, further comprising instructions configured to cause the processor to determining the threshold number of base stations based on a measurement capacity of the UE.

* * * * *